Aug. 7, 1928. 1,680,110
I. OSTROMISLENSKY
METHOD OF OBTAINING NEOPYRIDIUM
Filed March 26, 1926
*Fig. 1,*
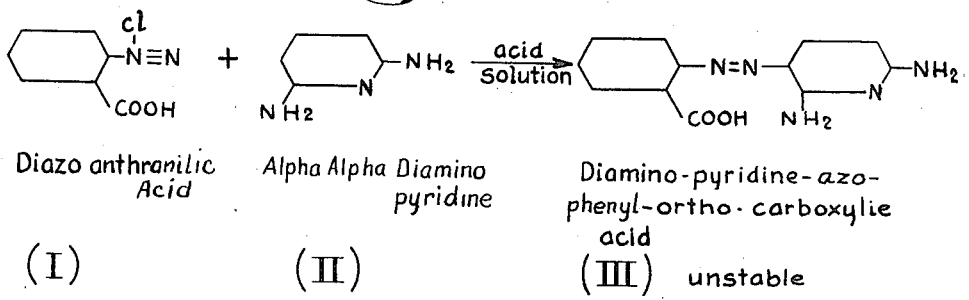
| Diazo anthranilic Acid | Alpha Alpha Diamino pyridine | Diamino-pyridine-azo-phenyl-ortho-carboxylic acid |
| (I) | (II) | (III) unstable |
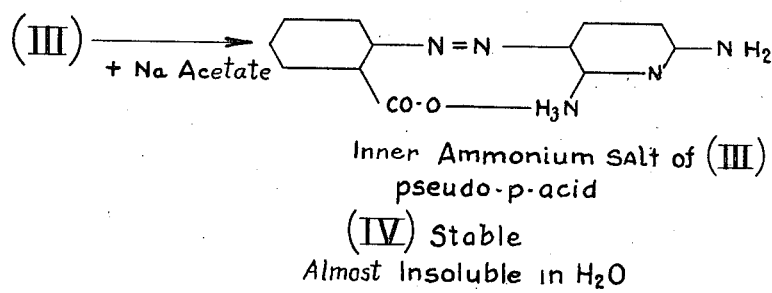
Inner Ammonium salt of (III) pseudo-p-acid
(IV) Stable
Almost Insoluble in H₂O
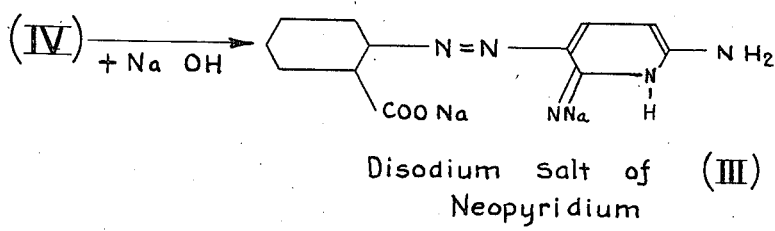
Disodium salt of (III)
Neopyridium
(V)
*Fig. 2,*
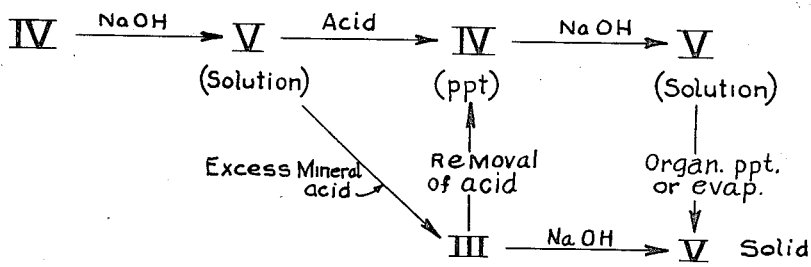
INVENTOR
*Iwan Ostromislensky*
BY
ATTORNEY Patented Aug. 7, 1928.

1,680,110

UNITED STATES PATENT OFFICE.

IWAN OSTROMISLENSKY, OF NEW YORK, N. Y., ASSIGNOR TO THE PYRIDIUM CORPORATION, OF NEW YORK, N. Y., A CORPORATION OF NEW YORK.

METHOD OF OBTAINING NEOPYRIDIUM.

Application filed March 26, 1926. Serial No. 97,772.

This invention relates to methods of obtaining pseudo diaminopyridineazophenyl-orthocarboxylic acid, its isomer of normal structure and to a method of obtaining the alkaline salts of the normal acid, and more particularly the disodium salt, which for the sake of convenience is designated neopyridium.

When diazotized anthranilic acid is reacted with diaminopyridine, a substance is formed, which may be classed among the inner salts. In the amphoteric compound obtained in the reaction, the basic and the acid groups apparently saturate one another, and a typical amine salt of a new series, neutral in character is formed. For convenience, this salt is designated pseudo-diamino-pyridineazophenylorthocarboxylic acid, or simply pseudo-p-acid.

The drawing forming a part hereof illustrates the reactions which take place in the formation of the product.

Fig. 1 illustrates the three steps in the formation of the disodium salt of neopyridium.

Fig. 2 illustrates the conversion of the inner ammonium salt of pseudo-p-acid to the solid neopyridium.

The diazotization of the anthranilic acid is performed in the usual manner, and the nature of the acid used, and the amount, can be varied within wide limits. Neither does the degree of concentration of the original anthranilic acid solution, nor that of the diaminopyridine solution modify the ultimate result of the reaction. Likewise, the acid used to dissolve the diamino-pyridine may be widely varied.

The reactions are shown diagrammatically in Fig. 1 of the drawing, wherein the anthranilic acid is designated (I), the alpha-alpha-diamino-pyridine (II), the diaminopyridine phenyl azo ortho-carboxylic acid (III), the stable product (IV), and the disodium salt (V). In Fig. 2, the entire process is represented. The inner ammonium salt of pseudo-p-acid is stable, and it may be separated out of the acid solution of the reaction by means of sodium acetate, other soluble organic salts, or a deficiency of mineral acid. The separation by means of sodium acetate is indicated in the drawing, wherein the reaction product of the coupling (I) and (II) treated with sodium acetate gives the inner ammonium salt indicated by (IV) and insoluble in water. The product (IV), the inner ammonium salt of (III), designated for convenience pseudo-p-acid, treated with sodium hydroxide gives the disodium salt of (III), which for convenience is designated neopyridium.

By treating the substance (IV) with a solution of sodium hydroxide, the disodium salt (V) is formed. In order to purify this salt, an acid is added, and precipitation follows. After filtration and drying the precipitate is the substance (IV) in chemically pure condition. This inner ammonium salt (IV) is treated again with sodium hydroxide solution in theoretical amount, and the solid can be obtained either by evaporation or by precipitation with an organic acid. If the original solution of (IV) in sodium hydroxide is treated with an excess of mineral acid, it forms substance (III), which after drying and removing the acid, is converted into (IV).

The product of the reaction, that is, the inner ammonium salt, may be separated out of the acid solution of the reaction, that is, from product (III), without the use of organic acid salts. When the salts are used, the inner ammonium salt is formed and separates of itself, as a primary product of the reaction.

There is a possibility that not only one, but two of the molecules of diaminopyridine-azo-phenyl-ortho-carboxylic acid, take part in the formation of the inner ammonium salt, in which case the structure of the compound might be like that which follows:—

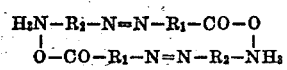

wherein $R_1$ stands for the phenyl residue, and $R_2$ for the amino-pyridine residue.

As an exemplification of the method the following procedure may be followed. To 154 gms. of anthranilic acid, a like quantity of water and 400 cc. of hydrochloric acid sp. gr. 1.183 are added. The resulting mixture is cooled with ice water, after which a solution of 114 gms. of sodium-nitrite in 7 litres of water is added. This solution should be added slowly with stirring. (Potassium iodide starch paper may be used as an indicator.)

A solution of hydrochloric acid and diazo-anthranilic acid results from the operation, and into this solution 200 gms. of diaminopyridine dissolved in 2 litres of 10% hydrochloric acid is added with stirring. The mixture is allowed to stand for some time at normal temperature, after which about 4 litres of an aqueous saturated solution of sodium acetate is added. The addition is continued until a weak acid reaction on Congo paper results.

The new compound is allowed to stand at normal temperatures for a time, usually from 1 to 3 hours, but it may stand for 24 hours or more. The mixture gradually takes on an intense red color, and a new substance in the form of amorphous dark red (wine colored) flakes separates out. The liquid part is evaporated in a partial vacuum, thoroughly washed with ice water, pressed and dried to constant weight, as for instance, in a desiccator over sulphuric acid.

Upon filtration the substance usually forms a plastic mass resembling very heavy cream. The color shade (red) acquired by the substance, although greatly resembling that of phenyl-azo-alpha-alpha-diamino-pyridine hydrochlorides, forming the subject matter of my prior application Serial No. 97,771, is nevertheless much darker, and is altogether different in the point of solubility.

The pseudo-p-acid is difficulty soluble in boiling water, and almost insoluble in cold. It displays a marked salt like nature, and in a hot aqueous solution the pseudo acid gives an entirely neutral reaction with Congo paper and litmus. It dissolves much more easily in weak hydrochloric acid, and especially when hot. The acid solutions are a more intense cherry red color than the neutral aqueous solution. The pseudo-p-acid is also soluble in weak ammonia and in alkalies, separating off and forming the corresponding di-metal salts (ammonium, sodium, calcium,) in accordance with the third reaction of Fig. 1; that is, the conversion of (IV) into (V).

Analysis of this salt (neopyridium) has shown that it contains two atoms of sodium. This fact is explainable only through tautometry, which is always characteristic of diamino-pyridine compounds. The formula of the salt is therefore probably:—

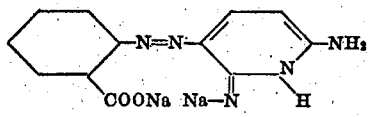

It is interesting to notice that the disodium salt is formed from the corresponding free acid under all circumstances, regardless of the quantity of caustic soda used in the reaction.

When the aqueous solutions of the salts are acidified with an excess of mineral acids, as for instance, hydrochloric acid, diamino-pyridine-azo-phenyl-ortho-carboxylic acid of normal structure (III), separates out in a free state, as indicated in the last equation of the drawing. If the same solutions are acidified with organic acids, (acetic, propionic, oleic, and the like,) or with a deficiency of mineral acid, the original primary pseudo-p-acid (IV), separates out once more. Removal of the acid in the former case results in the formation of the inner ammonium salt. When the neutral solution of the inner salt is treated with calcium chloride in aqueous solution, no sediment is formed, but the brownish yellow color of the salt changes to a pure golden yellow, and there can be no doubt but that a water soluble calcium salt is formed in the reaction.

The pseudo-p-acid is insoluble in benzol, and in alcohol and acetone, dissolving very slightly even when hot. In pyridine the pseudo-p-acid dissolves even in cold, and yet more readily when heated, forming a dark red solution, apparently of normal pyridine salts, for the solution does not throw down a sediment when diluted with water. The normal acid is almost insoluble in ether, but dissolves readily in nitro-benzol, and in aniline, especially if boiling. When heated in a capillary tube to 270° C., the acid does not melt, but apparently decomposes, gradually changing to a greenish yellow color.

Cuprous and cupric chloride, magnesium chloride, zinc chloride, iron chloride, mercury chloride, and cadmium iodide do not throw down a precipitate from aqueous solutions of pseudo-acids; but silver nitrite in aqueous solution gives a white amorphous and flaky precipitate, probably a normal salt of silver.

When the pseudo-p-acid is reacted with ammonium and the other alkalies, the corresponding water soluble salt is formed as previously mentioned. These salts are of normal structure, and present great practical interest in many respects. The salts may be isolated in solid aggregate conditions by either of the procedures outlined below.

The pseudo-p-acid suspended in distilled water is treated with a weak aqueous solution of caustic soda taken in theoretical amounts. The resulting red solution of sodium salt (V) is filtered if necessary, and the filtrate evaporated to dryness over a water bath, the reaction being shown at the right of the last equation in the drawing.

The product obtained is a fine micro-crystalline yellow powder with a reddish sheen, highly soluble in water. The same normal salt can be obtained by precipitating an ammonium or other alkaline solution of pseudo-p-acid in water or in alcohol, by means of different organic solvents, such as acetone, ether, and ether-alcoholic mixture, or the like.

The disodium salt of diaminopyridine-azo-phenyl-ortho-carboxylic acid (neopyridium)

is of especial interest. While but slightly toxic, it has strong bactericidal effects. It gives an almost neutral reaction, and is readily soluble in water. Introduced directly into the blood of the human body, by intravenous injection, in a definite dose, it causes no reaction either local or general.

The statements in regard to structure are theoretical, and are not intended as limitations.

What is claimed as new is:

1. The step in the method of obtaining a sodium salt of diaminopyridineazophenylorthocarboxylic acid, which consists in reacting solutions of diaminopyridine and diazotized anthranilic acid, thereby to produce the inner ammonium salt of diaminopyridineazophenylorthocarboxylic acid.

2. The steps in the method of obtaining a sodium salt of diaminopyridineazophenylorthocarboxylic acid, which consists in mixing aqueous solutions of diazotized anthranilic acid and diaminopyridine and adding to the mixture a soluble salt of an organic acid in aqueous solution.

3. The steps in the method of obtaining a sodium salt of diaminopyridineazophenylorthocarboxylic acid, which consists in mixing acid aqueous solutions of diazotized anthranilic acid and diaminopyridine and adding to the mixture a saturated aqueous solution of sodium acetate until a weak acid reaction with Congo is produced.

4. In the method of obtaining a disodium salt of diaminopyridineazophenylorthocarboxylic acid, the steps which consist in mixing acid aqueous solutions of diazotized anthranilic acid and diaminopyridine, adding to the mixture a saturated aqueous solution of sodium acetate, filtering, expressing the residue and drying.

5. The method of obtaining the disodium salt of diaminopyridineazophenylorthocarboxylic acid, which consists in mixing acid aqueous solutions of diazotized anthranilic acid and diaminopyridine, adding to the mixture a saturated aqueous solution of sodium acetate, removing the liquid, dissolving the residue in an alkali, precipitating pseudo-p-acid by adding an acid to the solution, and then treating again with sodium hydroxide.

6. The method of obtaining the disodium salt of diaminopyridineazophenylorthocarboxylic acid, which consists in mixing acid aqueous solutions of diazotized anthranilic acid and diaminopyridine, adding to the mixture a saturated aqueous solution of sodium acetate, removing the liquid, dissolving the residue in an alkali, precipitating pseudo-p-acid with acetic acid, and then treating again with sodium hydroxide.

7. The method of obtaining a sodium salt of diaminopyridineazophenylorthocarboxylic acid, which consists in adding alkalies to an aqueous suspension of the inner ammonium salt of diaminopyridineazophenylorthocarboxylic acid and evaporating the resulting solution to constant weight of the residue which is formed.

8. The method of obtaining the disodium salt of diaminopyridineazophenylorthocarboxylic acid, which consists in adding the theoretical amount of alkalies to an aqueous solution of diaminopyridineazophenylorthocarboxylic acid, filtering and evaporating the resulting compound to the constant weight of the residue which is formed.

9. The method of obtaining the disodium salt of diaminopyridineazophenylorthocarboxylic acid, which consists in precipitating alkaline solutions of a form of diaminopyridineazophenylorthocarboxylic acid in an organic medium which is miscible with water but which is not a solvent for the said disodium salt.

10. In the method of obtaining a sodium salt of diaminopyridineazophenylorthocarboxylic acid, the step which consists in treating the normal salt of diaminopyridineazophenylorthocarboxylic acid, with an organic acid thereby to obtain the inner ammonium salt of diaminopyridineazophenylorthocarboxylic acid.

11. As an article of manufacture, a sodium salt of diaminopyridineazophenylorthocarboxylic acid, which has the following properties: orange red apparently amorphous powder, easily soluble in cold water to form an orange or brownish red transparent solution and insoluble in acetone and ether.

12. As an article of manufacture a disodium salt of diaminopyridineazophenylorthocarboxylic acid, which has the probable structural formula:

$C_6H_4(COONa)N_2C_5H_2NNH_2(NNa)$.

Signed at New York city, in the county of New York and State of New York this 24th day of March, A. D. 1926.

IWAN OSTROMISLENSKY